Figure 1:
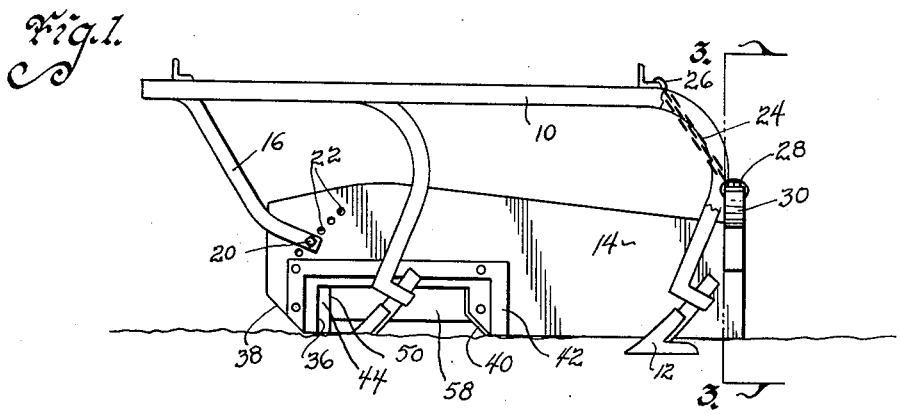

Sept. 3, 1957  L. M. DOLLEN  2,804,815
CULTIVATOR SHIELD
Filed Feb. 15, 1954  3 Sheets-Sheet 1

Inventor
Lynn M. Dollen
by Talbert Dick & Adler
Attorneys

Witness
Edward P. Seeley

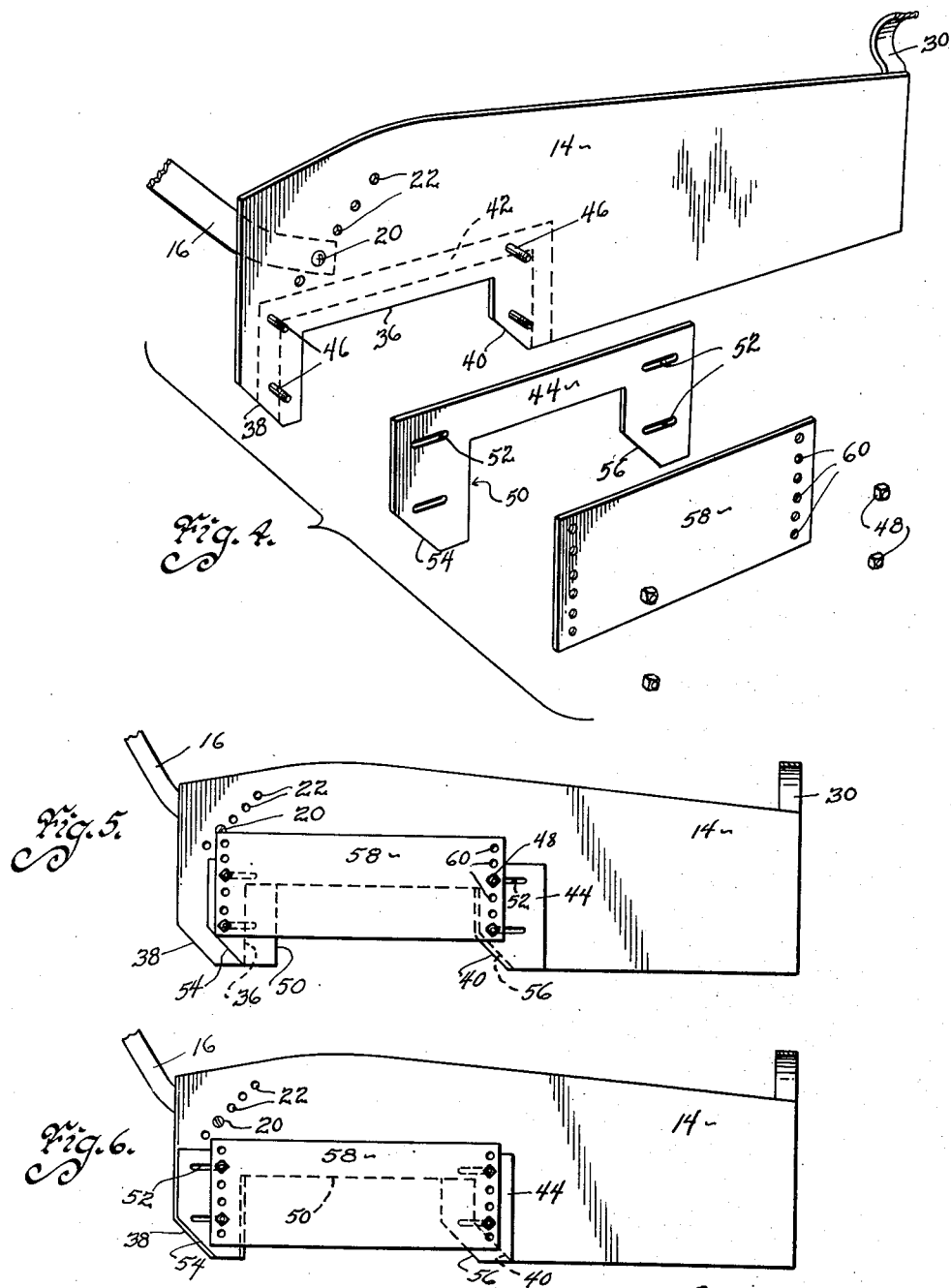

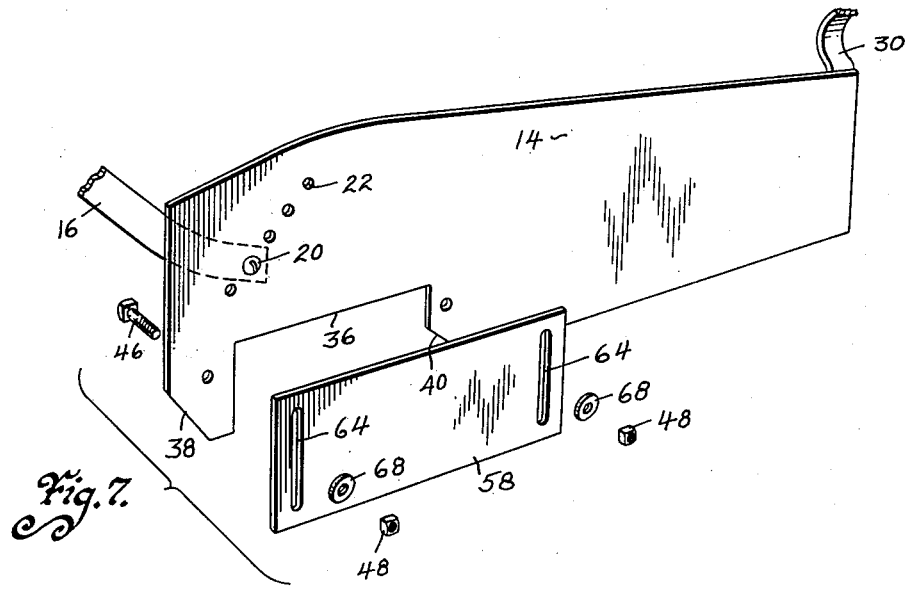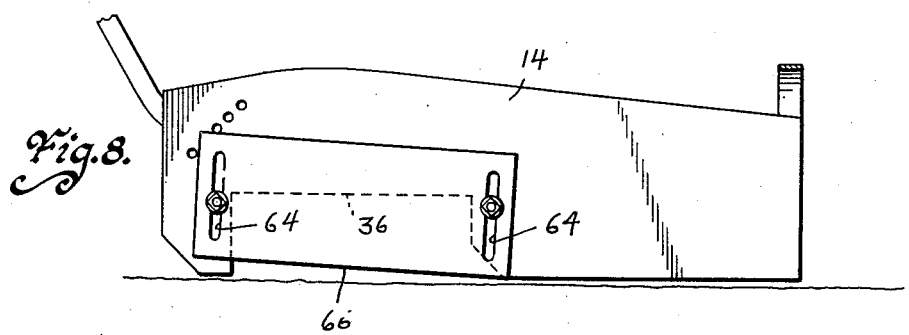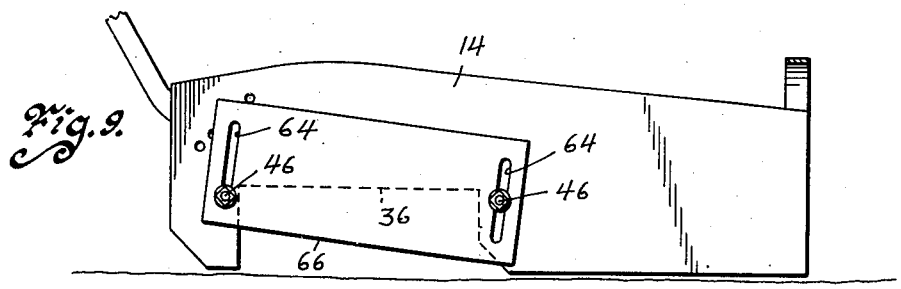

United States Patent Office 2,804,815
Patented Sept. 3, 1957

2,804,815

CULTIVATOR SHIELD

Lynn M. Dollen, Persia, Iowa

Application February 15, 1954, Serial No. 410,404

4 Claims. (Cl. 97—188)

My invention relates to the art of shielding young plants against crushing or other damage resulting from clods being thrown against the plants during the act of cultivating, and this application is a continuation-in-part of my co-pending application for the same device, Serial No. 256,683, filed November 16, 1951, which is abandoned in view of this application.

More specifically, I have invented a cultivator shield having an adjustable opening therein which permits the user to prevent excessive dirt from getting on the young plants without soil "starving" them.

There are many cultivator shields on the market which are solid sheets of metal or other suitable material that may be adjusted to permit some soil to pass underneath them. They are generally, however, solid throughout their lengths, so that the amount of soil allowed to pass under any part of the shield is about the same throughout its length, and in this respect I have found that a much more satisfactory result will obtain if the plane of the bottom edge of the shield is not always parallel to the ground. Such an arrangement cannot be effected on present type shields since they are usually secured to the cultivator in a manner that permits the shield to "float" over the ground. Thus, if the front of the shield is raised it is possible for quantities of loose dirt or clods to get under the front of the shield and boost the whole shield to a higher position than was intended and is desirable.

On the other hand, if these solid shields are adjusted as to permit no dirt to be applied to the young plants, vertical and horizontal erosion of even a mild nature may well leave the plant undernourished or even with its roots exposed. Also, after considerable cultivating has been done, these solid shields may pile up a large quantity of dirt that may even spill over the top of the shield onto the plants. In any event, a heavy accumulation that is held back by the shield until it passes may overpower the young plants as the shield goes by the dirt and allows the dirt to fall sideways toward the crop row.

I am aware that some of the rotary shields on the market are arranged to permit some dirt to sift through the shields to support the young plants properly without overburdening them with great clods or the like, but these shields are very expensive to build when compared to straight gliding shields. Furthermore, the rotary shields have limited ability for longitudinal protection because their diameter determines the extent of the longitudinal coverage they offer, and the diameter that may be used conveniently is quite limited by the structure of the cultivator. The framework which must support the cultivator necessarily prohibits excessive diameters for these shields. Even more important, however, the size of these rotary shields is limited by the requirements for ease in handling. A rotary shield would have to be exceedingly large to give the same longitudinal protection that can be derived easily from a rectangular "floating" shield. The rotary shields have some advantages over floating shields, but my new shield reduces the advantages of rotary shields over rectangular shields as will be appreciated hereinafter.

In view of the foregoing, it is the principal object of my invention to provide a cultivator shield of the rectangular "floating" type that has an opening therein to allow some of the dirt turned by the cultivator shovels to fall around the bases of the plants being cultivated.

It is a further object of my invention to provide a cultivator shield that avoids the accumulation of excessive quantities of dirt behind the shield.

It is a further object of my invention to provide a cultivator shield having an opening therein which is longitudinally adjustable with respect to the shield.

It is a still further object of my invention to provide a cultivator shield having an opening therein that may be adjusted longitudinally and varied in size vertically and wherein these adjustments may be made independently of each other.

It is a further object of my invention to provide a cultivator shield that permits the amount of dirt that is deposited around the plants by the cultivator to be increased as the plants grow.

It is a still further object of my invention to provide a cultivator shield that will control to some extent the longitudinal placement of the dirt displaced by the shovels of the cultivator.

Another important object of this invention is to provide a cultivator shield of the above class that can be vertically adjusted relative to the ground so that the bottom of the shield is disposed at an angle to a horizontal plane and thus the distance between the bottom of the shield and ground varies progressively from one end of the shield to the other.

These and other objects will be apparent to those skilled in the art.

Figure 2:
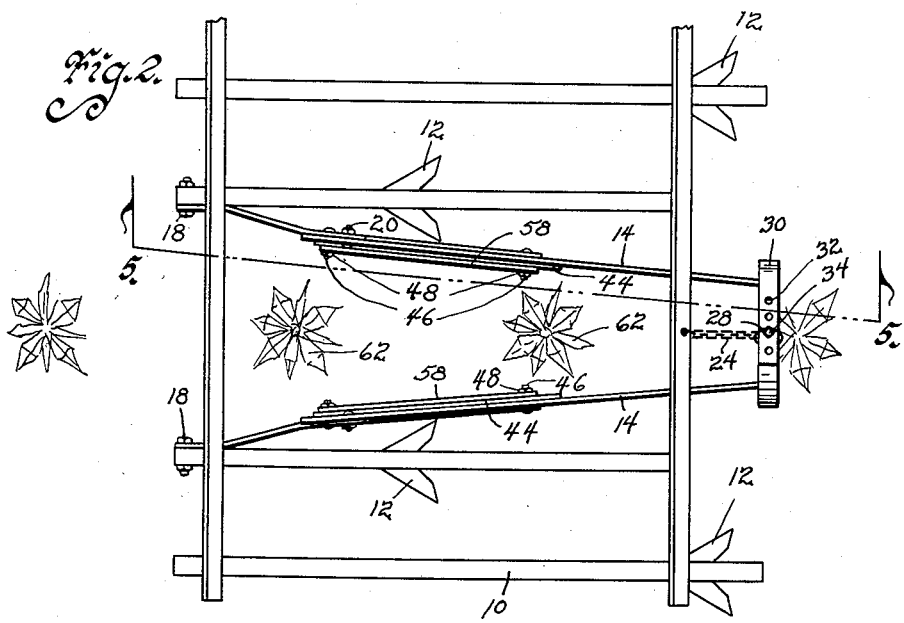
Figure 3:
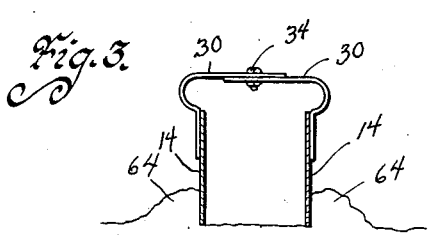

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of a cultivator equipped with one of my shields. A portion of the cultivator is broken away to more fully illustrate the structure of the shield support, Fig. 2 is a top view of a cultivator equipped with my shields protecting young plants from excessive quantities of dirt and clods, Fig. 3 is a cross-sectional view of my shields and rear support taken on the line 3—3 of Fig. 1, Fig. 4 is an enlarged exploded view of one of my shields shown in perspective, Fig. 5 is an enlarged side view of one shield with broken lines showing hidden parts and taken on the line 5—5 of Fig. 2. One adjusted position of the opening is shown, Fig. 6 is a similar view to that shown in Fig. 5, but the shield is shown with altered adjustments, Fig. 7 is an enlarged exploded perspective view showing a preferred variation of this invention, Fig. 8 is an enlarged side elevational view of the shield in Fig. 7 illustrating its adjustability to a position away from a parallel position with the ground, and Fig. 9 is similar to Fig. 8 to show different positions of adjustment.

Referring to the drawings, I have used the numeral 10 to designate a cultivator frame carrying the usual cultivator shovels 12. As the two shields making up a pair for one row of crops are substantial duplicates of each other only one of these shields will be described in detail. The numeral 14 designates the shield proper which is secured to the cultivator frame at its forward end by the support arm bar 16. The bar is secured to the frame in any suitable manner as by the nut and bolt 18 and is secured to the shield in a similar manner, the bolt in this case designated 20. A plurality of attaching holes 22 are provided at the forward end of the shield which provide a combination of vertical and longitudinal adjustment simultaneously. At the rear of the shield a chain 24 floatingly supports the rear end of the shield assembly from the rear of the cultivator frame 10. The chain is secured to the frame in any suitable manner as by the hook 26 or the like. The other end of the chain carries a ring 28 or some other suitable means for securing the chain to the rear shield supporting and spacing bracket, designated 30. The bracket is provided with numerous holes 32 to permit lateral adjustment of the bracket elements relative to each other by inserting the bolt 34 into the appropriate holes.

The shield itself has an opening or elongated notch designated 36 formed in the bottom edge and near the forward end thereof. Both the lower forward end 38 of the shield and the trailing side 40 of opening 36 are slanted to avoid any possibility of the shield catching on clods or the like and damaging the equipment. A frame or reinforcing border 42 of strap metal or any suitable material strengthens the shield in the vicinity of the opening. It may be secured to the shield in any manner consistent with the material used such as welding in the case of metal. A plate designated 44 is secured to the shield by the use of some releasable means such as the stud bolts 46 and their cooperating nuts 48. The plate 44 has an opening or notch 50 in its bottom edge which is generally shaped like the opening 36 in the main shield 14 except that the plate opening is shorter than the main shield opening by the length of the slots designated 52. The lower forward edge 54 of the plate and the trailing edge 56 of the plate opening 50 are slanted or beveled in the same manner as the corresponding portions of the main shield. The slots 52 embrace the stud bolts of the main shield and permit longitudinal adjustment of the plate relative to the shield. A second plate 58 is solid and long enough to reach between the studs. The solid plate 58 is provided with a plurality of vertically spaced holes 60. These vertically spaced holes permit the solid plate 58 to be adjusted vertically as shown in Figs. 5 and 6. This arrangement of the plates permits the exact control of the amount and size of pieces of dirt deposited around the plants 62 shown in Fig. 2. The shield prevents excessive dirt from being thrown against the plants 62, however, as shown in Fig. 3 where the dirt 64 loosened by the shovels 12 of the cultivator has piled up against the shield.

By reason of the particular structure I have evolved, one person can easily and quickly adjust the shield opening as desired. Since the slots were used only in the longitudinally adjustable plate, neither need be supported while the nuts are being tightened after the adjustments have been made. To adjust the position of the opening in the shield longitudinally, the nuts 48 are loosened and plate 44 may then be slidably moved to the desired location. If the opening is to be made taller or shorter, however, the nuts must be removed from the studs and plate 58 pulled clear of the stud ends and repositioned as desired. The nuts are then replaced and tightened. If the maximum height of opening is to be used, plate 58 is omitted from the assembly altogether. The studs 46 are positioned with their threaded ends facing toward the plants 62 as shown in Fig. 2 as the inside of the shield is less subject to contact with dirt and fertilizers which would clog and corrode the threads thus making adjustment of the shield opening difficult. Bolts could be used in place of the studs 46, but the former are preferred since only one tightening tool is necessary with such structure. The slanting forward facing portions 38, 40, 54 and 56 of the main shield and plate 44 respectively, and particularly the latter, avoid catching of the shield on dirt clods or the like and minimize the tendency of the opening to catch and hold clogging weeds or the like that would prevent the normal operation of the opening.

With reference now to Figs. 7, 8 and 9, I show a slight variation in structure of plate 58 that increases materially its adjustability, and this variation resides in the use of an elongated vertical slot 64 at each side thereof in place of the vertical rows of holes 60 shown in Fig. 4. Slots 64 are wide enough to permit the tilting of plate 58 on the stud bolts 46 so that the distance of the bottom edge 66 of plate 58 from the ground will vary progressively from one end to the other and more particularly be arranged to be progressively greater from rear to front as shown in Figs. 8 and 9. Suitable washers 68 are, of course, employed behind nuts 48 for obvious reasons.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my cultivator shield without departing from the real spirit and purpose of my invention, and it is my intention to cover by my claims any modified forms of structure or use of mechanical equivalents which may reasonably be included within their scope.

I claim:

1. A cultivator shield, comprising, an elongated flat shield member having top and bottom edges and having an elongated notch formed in its bottom edge, a first plate member having top and bottom edges and having a notch formed in its bottom edge, said last mentioned notch being shorter in length than the first, supporting means on said shield for holding said plate member so that said respective notches are adjacent each other, means on said plate member to admit of its longitudinal movement relative to said shield whereby the length of the opening formed by the respective notches is variable, a second plate member detachably mounted on said support means adjacent said first plate member, and means on said second plate member to admit of its vertical adjustment on said support means whereby the vertical height of the opening formed by said notches is variable.

2. A cultivator shield, comprising, a shield member having an opening formed in its bottom edge, a stud on said shield member at opposite sides respectively of the opening therein, a first plate having an opening formed in its bottom edge, the opening in said first plate being shorter than and of the same depth as the opening in the shield member, said first plate having a horizontal slot at opposite ends of the opening therein, said first plate mounted adjacent said shield member so that said slots engage said respective studs whereby said first plate is movable longitudinally of said shield member to selectively vary the length of the opening in said shield member, a second plate having a plurality of vertically spaced holes at opposite end portions, and said second plate mounted adjacent said first plate so that different holes at times in said second plate can be selectively engaged with said respective studs to vary the height of the bottom of said second plate and thereby vary the depth of the openings in said first plate and said shield member.

3. In a cultivator shield adapted for use with a cultivator, comprising, a pair of shield members, means secured to each of said shield members for supporting the same between the shovels of a cultivator, a second means secured to the rear ends of said shield members holding said rear ends closer together than the forward ends, said shield members having slanted forward ends and elongated notches formed in their lower forward edges, the trailing portions of said elongated notches slanted like the forward ends of said shield members, a first means secured to each of said shield members for altering the length of the notches therein, a second means for altering the height of said notches, and a common support on said shield members for both of said last mentioned means.

4. A cultivator shield, comprising, an elongated flat shield member having top and bottom edges and having an elongated notch formed in its bottom edge, a first plate member having top and bottom edges and having a notch formed in its bottom edge, said last mentioned notch being shorter in length than the first and of the same depth, supporting means on said shield for holding said plate member so that said respective notches are adjacent each other, means on said plate member to admit of its longitudinal movement relative to said shield whereby the length of the opening formed by the respective notches is variable, a second plate member detachably mounted on said support means adjacent said first plate member, and means on said second plate member to admit of its vertical adjustment on said support means whereby the vertical height of the opening formed by said notches is variable.

References Cited in the file of this patent

UNITED STATES PATENTS

| Number | Name | Date |
|---|---|---|
| 68,165 | Canfield | Aug. 27, 1867 |
| 249,740 | Browne | Nov. 22, 1881 |
| 463,933 | Armstrong | Nov. 24, 1891 |
| 668,136 | Bond et al. | Feb. 12, 1901 |
| 944,770 | Brigden | Dec. 28, 1909 |
| 2,319,047 | Fell | May 11, 1943 |
| 2,417,597 | Hill | Mar. 18, 1947 |
| 2,597,111 | Lathers | May 20, 1952 |
| 2,662,462 | Hammon | Dec. 15, 1953 |
| 2,665,994 | Gumm | Jan. 12, 1954 |